United States Patent [19]

Sanders et al.

[11] 4,177,868
[45] Dec. 11, 1979

[54] WEIGHT-MEASURING AND DISPLAY DEVICE

[75] Inventors: Louis H. Sanders; Kenneth L. Watkins; Galt S. Bowen, all of Albuquerque, N. Mex.

[73] Assignee: Bio-Dynamics Inc., Indianapolis, Ind.

[21] Appl. No.: 873,530

[22] Filed: Jan. 30, 1978

[51] Int. Cl.$^2$ .................. G01G 3/14; G01G 19/44
[52] U.S. Cl. .................. 177/211; 73/141 A; 177/DIG. 3; 324/DIG. 1
[58] Field of Search .................. 177/211, DIG. 3, 159; 73/141 A; 324/DIG. 1

[56] References Cited

U.S. PATENT DOCUMENTS

| | | | |
|---|---|---|---|
| 2,354,390 | 7/1944 | Lowy | 177/159 |
| 2,899,191 | 8/1959 | Hunt | 177/211 |
| 3,655,003 | 4/1972 | Yamajima | 177/210 X |
| 3,770,069 | 11/1973 | Loshbough | 177/25 X |
| 3,838,744 | 10/1974 | Tanji | 177/DIG. 3 |
| 3,853,191 | 12/1974 | Yamagiwa | 177/DIG. 3 |
| 3,967,690 | 7/1976 | Northcutt | 177/DIG. 3 |
| 4,082,154 | 4/1978 | Pillote | 177/211 |

Primary Examiner—Joseph W. Hartary
Attorney, Agent, or Firm—Woodard, Weikart, Emhardt & Naughton

[57] ABSTRACT

A weight-measuring and display device includes a rigid structural housing for supporting a load positioned thereon and a strain-sensing and weight-displaying circuit located within the structural housing. The rigid structural housing includes a top plate on which the user stands or the load is placed, a bottom plate and three deflection beams horizontally arranged between the top and bottom plates. Mounted to the top of each deflection beam is a strain gauge and mounted to the bottom of each deflection beam is another strain gauge. The group of three top mounted strain gauges accounts for the resistance in one arm of a wheatstone bridge and the group of three bottom mounted strain gauges accounts for the resistance in a second, adjacent arm of the wheatstone bridge. In addition to the wheatstone bridge, the strain-sensing and weight-displaying circuit further includes an amplifier portion, an analog to digital converter, a BCD to seven-segment decoder and three, seven-segment LED readouts.

27 Claims, 8 Drawing Figures

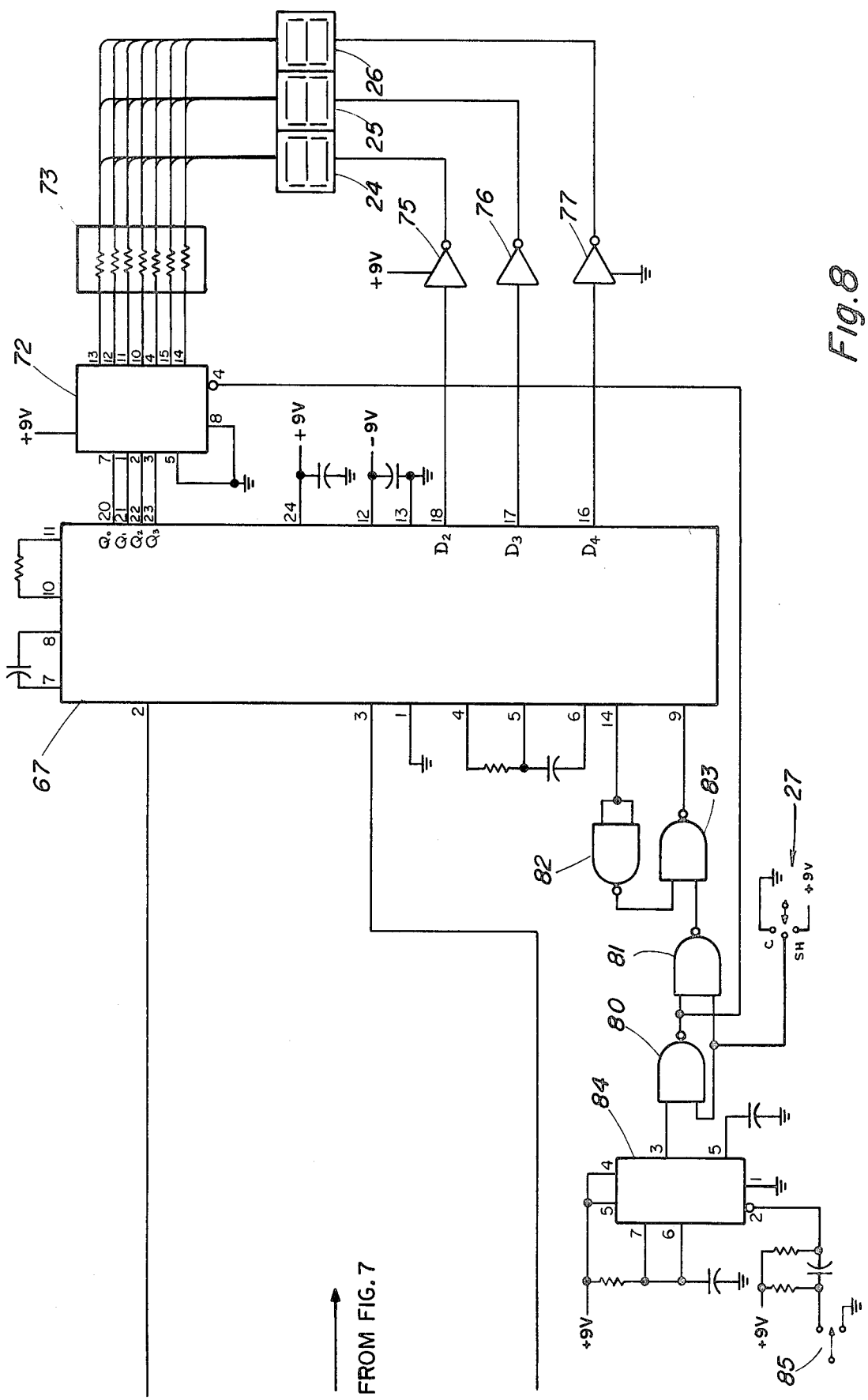

WEIGHT-MEASURING AND DISPLAY DEVICE

BACKGROUND OF THE INVENTION

This invention relates in general to weight-displaying devices and in particular to electronic weight-measuring devices.

Weight-measuring and displaying devices are available in a variety of types and sizes depending upon the particular application and the weight range to be encountered. In order to assure full indicator scale accuracy, most weight measuring devices are designed for particular uses and the internal construction of such devices corresponds with the intended application. For example, a scale designed to weigh metal bar stock in units of tons is not suitable as a scale to detect differences of only a few pounds. One type of scale which is capable of detecting weight variations of a few pounds are bathroom scales. Such scales are typically designed with a full dial range of up to 300 pounds, and are able to reflect weight differences of approximately one to two pounds. However, such scales have a variety of disadvantages such as, for example, the need to frequently be re-zeroed because variations may occur between the time one reading it taken and the next time the scale is used. Further disadvantages with such scales are the inability to read the dial indicator accurately and the fact that such scales are often heavy and bulky.

With the introduction of solid state electronic technology, it is possible to convert conventional dial indicator readings into digitally displayed numerical values that are accurate and repeatable (when the actual weight is the same). The following list of patents provides some indication of the types of electronic scale concepts which have been devised:

| Patent No. | Patentee | Issue Date |
|---|---|---|
| 3,655,003 | Yamajima | 4/11/72 |
| 3,838,744 | Tanji et al. | 10/01/74 |
| 3,770,069 | Loshbough | 11/06/73 |
| 3,967,690 | Northcutt | 7/06/76 |

Yamajima discloses a weighing machine which includes an adjustable height scale ring in concentric relation with the weight scale dial so that a person being weighed may recognize at a glance his actual weight relative to the optimum weight for a particular height. This device does not actually provide any new design to the basic scale mechanism, it only adapts a new feature to such a conventional scale.

Tanji et al. discloses an electronic weight-measuring device wherein the user's weight is displayed by digital display tubes and this weight may be displayed in a plurality of locations remote from the platform of the scale on which the user stands. The disclosure of this patent deals primarily with the manner in which a plurality of remote display devices can be used and there is virtually no mention of the electronics which are employed for such display devices. It is not clear whether such a device overcomes the problems with accuracy and repeatability of conventional scales, but it is apparent that the design disclosed has not attempted to solve the weight and bulkiness problems associated with conventional bathroom scales.

Loshbough discloses a control circuit for an electronic computing scale which computes the value of an article based upon a predetermined price per unit weight for the article. The requirement of being a computing scale creates an added expense to the scale due to the extent of the electronics involved, and such a device is too complex to serve as a conventional bathroom scale.

Northcutt discloses an electronic digital readout diet scale which includes electronic circuitry for accurately detecting and displaying minute changes of weight in a dieter. A voltage-controlled oscillator puts out a frequency (dependent upon voltage input) in the form of a number of cycles per unit of time. One problem with voltage-controlled oscillators is that the time base must be very accurate and in order to achieve this accuracy, the time should be crystal controlled. However, the use of crystal control for a device such as a scale is not desirable because of the fact that crystals are not able to withstand even moderate levels of mechanical vibrations. A further shortcoming with the Northcutt device is that the voltage-controlled oscillator and the time base oscillator are not in phase and an error of plus or minus one cycle could result. Although such an error could be rounded off, it is still a disadvantage to have such error present with the device.

SUMMARY OF THE INVENTION

A weight-measuring and display device according to one embodiment of the present invention comprises a rigid structure, a strain-measuring and display driver circuit and display means for providing and indicating the weight of a load positioned atop the rigid structure. The rigid structure includes a top plate, a bottom plate, a plurality of deflection beams, means for transmitting a line of force to each deflection beam and means for sensing strain present within each deflection beam and providing a measurable indication proportional to the load positioned on the top plate.

One object of the present invention is to provide an improved weight-measuring and display device.

Related objects and advantages of the present invention will be apparent from the following description.

BRIEF DESCRIPTION OF THE DRAWINGS

FIG. 8 is a circuit schematic of the remaining electronics of the FIG. 1 device.

DESCRIPTION OF THE PREFERRED EMBODIMENT

Figure 1:
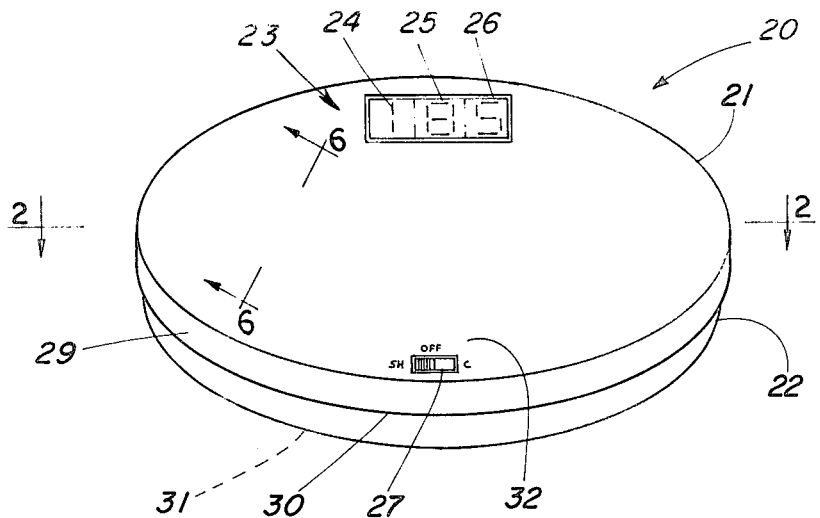
FIG. 1 is a perspective view of a weight-measuring and display device according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is illustrated a weight-measuring and display device 20 which includes a circular top plate 21, circular bottom plate 22, display window 23 and weight display readouts 24, 25 and 26 for hundreds, tens and ones, respectively. Three-position switch 27 controls the energizing of the circuit for the display and when in the OFF position the weight of a load positioned on top plate 21 will not have any effect on the display circuitry. Although illustrated as positioned in top plate 21, switch 27 could just as well be located in the vertical periphery portion between top plate 21 and bottom plate 22. There are two "ON" modes of operation (the other two of the three switch positions), the sample and hold mode indicated as "SH" and the continuous mode indicated as "C." These two "ON" modes of operation will be described in greater detail hereinafter. Although shapes other than circular are acceptable for top plate 21 and bottom plate 22, a circular design maximizes the surface area for a particular outside length (or width) dimension. The outside diameter of top plate 21 is slightly large than the outside diameter of bottom plate 22 and depending lip portion 29 of top plate 21 provides a type of surrounding enclosure for the space between plates 21 and 22 where additional features of device 20 are nested within various cavities in bottom plate 22. Lower edge 30 of lip portion 29 is approximately 0.25 inches above the underside 31 of bottom plate 22. Underside 31 is the surface which rests on the floor or supporting structure when device 20 is being used. The 0.25 inch clearance is necessary to accommodate slight downward movement of top plate 21 when the load to be weighed is placed upon top surface 32. With top plate 21 removed, the internal features of device 20 are illustrated by FIG. 2 which is a sectional view through device 20.

Figure 2:
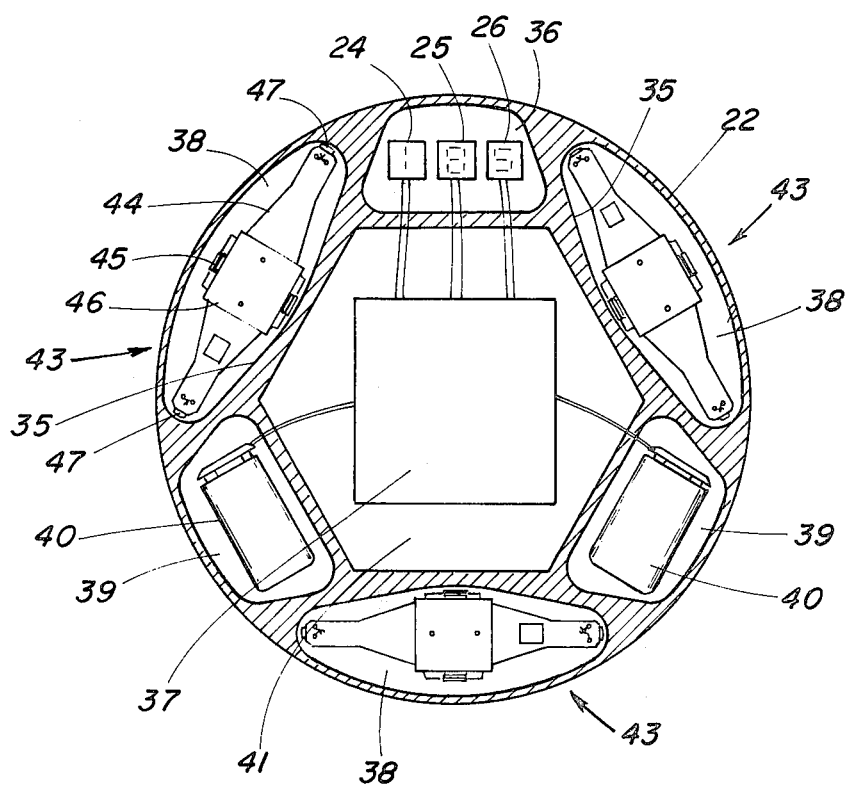
FIG. 2 is a sectional view of the FIG. 1 device taken along line 2—2 in FIG. 1.

Referring to FIG. 2, it is shown that the internal portion of bottom plate 22 is a compartment and webbed-like structure wherein individual areas are separated for the placement of particular structural members and electrical components which are associated with device 20. The web-like members 35 may be added separately to bottom plate 22, but preferably these members are molded in or cast as part of bottom plate 22 so that no subsequent machining is necessary in order to have the properly sized and positioned compartments. Display cavity 36 houses the three weight-display readouts 24, 25 and 26 which are conventional seven segment LED readouts and are electrically coupled to circuit section 37 as will be described hereinafter. Deflection beam cavities 38 are geometrically the same and radially spaced from each other around the center of plate 22, each deflection beam cavity being 120° apart. Battery cavities 39 are nested between adjacent deflection beam cavities 38 and the batteries 40 contained therein are electrically coupled to circuit section 37 as will be described hereinafter. Circuit cavity 41 is hexagonal in shape and symmetrically centered within bottom plate 22 and in fact the entire webbed arrangement of bottom plate 22 is symmetrical such that cavities 36 and 39 could be interchangeable with each other. This permits display readouts 24, 25 and 26 to initially be located in any one of the three cavities 36 or 39 during the fabrication of device 20 and not affect circuit performance. As previously mentioned, bottom plate 22 could be either molded or cast in order to create the various cavities and web-like members therebetween. These web-like members provide a surrounding protecting wall structure for the components packaged within the various cavities. Although metals such as aluminum and steel could be used, it is preferred that bottom plate 22 as well as top plate 21 be constructed out of a thermoforming or thermosetting, high-impact plastic which will provide suitable strength for large weight loads while at the same time providing a lightweight construction for a convenient and portable unit.

Batteries 40 which couple to circuit section 37 provide both positive and negative voltage potentials which are required for the operation of circuit section 37. Within each deflection beam cavity 38 is a deflection beam assembly 43 (see FIG. 3) which comprises a deflection beam 44, a cylindrical load pin 45, a load pin retaining block 46 and two support buttons 47. The three deflection beam assemblies, which are identical as to the details of their construction, are horizontally arranged between the top and bottom plates. The heights above bottom plate 22 of the various components which have been described, such as, the batteries 40, circuit section 37, display readouts 24, 25 and 26 and the deflection beam assemblies 43 are such that the only components which actually contact the inner surface of top plate 21 are the three load pin retaining blocks 46 which are actually attached to top plate 21 by means of conventional fasteners. Circuit section 37 is arranged on a single circuit board which may either be of a terminal board design or of a printed circuit design, and this circuit board is individually mounted within circuit cavity 41 and is both removable and replaceable. Thus, if component failures occur within circuit section 37, the display segments and batteries can be quickly disconnected therefrom, circuit section 37 removed and a new (and possibly temporary) circuit board inserted thereby returning weight-measuring and display device 20 to a ready-for-use status. This allows the circuit section 37 to be worked on separately without having to sacrifice the continued availability of device 20 during the time the circuit section 37 is being repaired.

Figure 3:
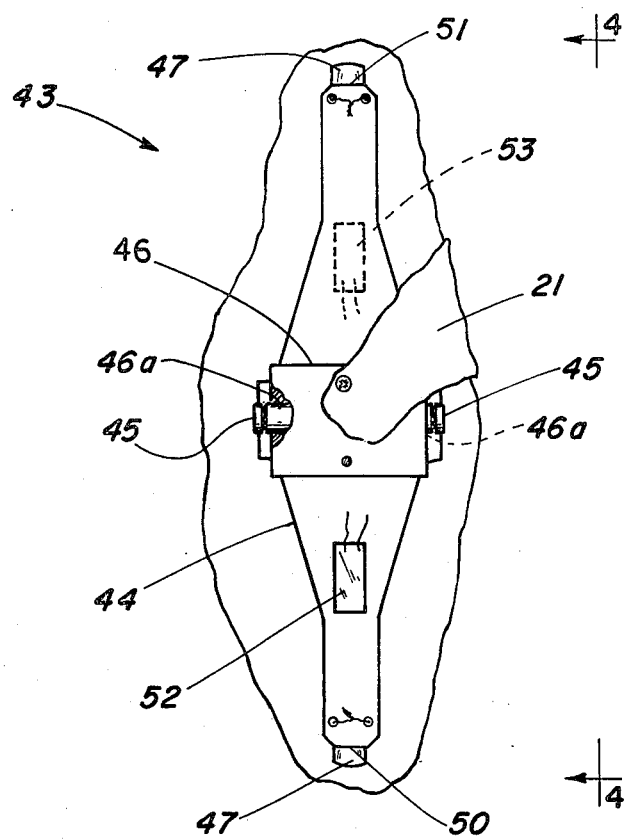
FIG. 3 is a fragmentary top view of a deflection beam assembly comprising a portion of the FIG. 1 device.
Figure 4:
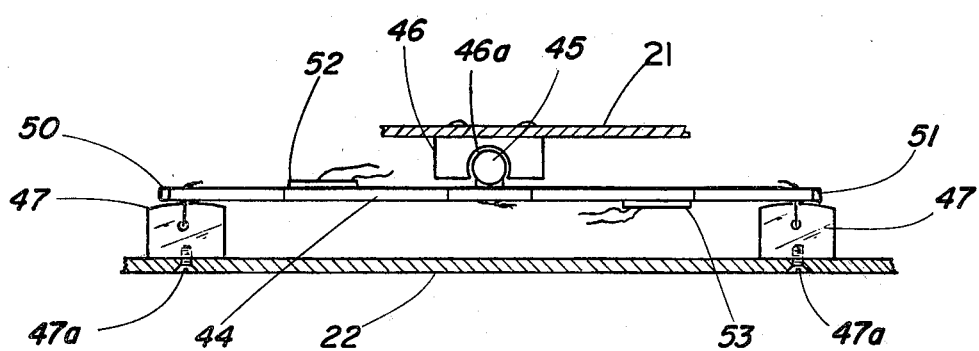
FIG. 4 is a fragmentary side view of the FIG. 3 deflection beam assembly taken along line 4—4 in FIG. 3.
Figure 5:
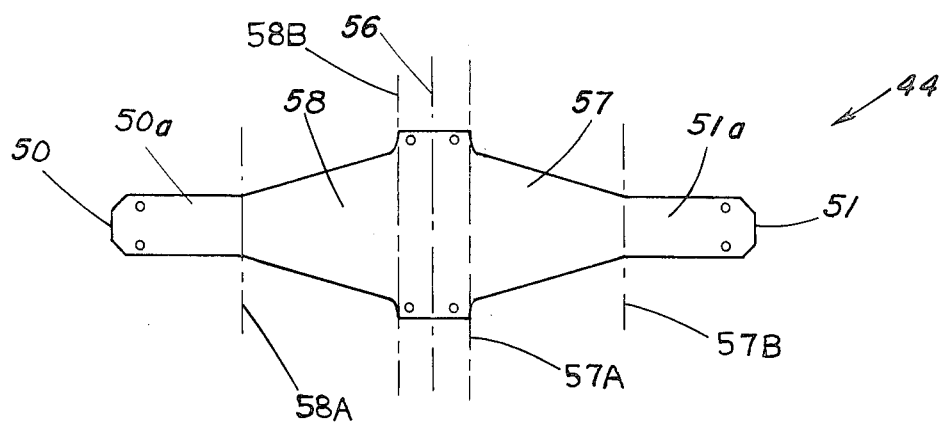
FIG. 5 is a top view of a deflection beam comprising a portion of the FIG. 3 deflection beam assembly.

Referring to FIGS. 3 and 4, there is illustrated in detail one deflection beam assembly 43. The following description as to the details of the deflection beam assembly 43 shown is to be understood to be the same for each of the various deflection beam assemblies. Deflection beam 44 extends for approximately 4.25 inches from end 50 to end 51. The longitudinal axis of each deflection beam 44 is perpendicular to a corresponding radially extending line from the center of the bottom plate 22. There are three such radially extending lines equally spaced 120 degrees apart. Each radially extending line is substantially coincident with the cylindrical axis of the corresponding load pin 45. Each end 50 and 51 rests atop a support button 47 and is tied thereto by wire such that deflection beam 44 is unable to be separated from the two support buttons 47 without removal of the wires. The center portion of deflection beam 44 is of an increased width dimension and is widest at the point where the longitudinal centerlines of load pin 45 and load pin retaining block 46 are positioned. Load pin retaining block 46 is securely fastened to top plate 21 with conventional fasteners such as screws or may be secured by an adhesive which is suitable for the materials present. The center portion of retaining block 46 is a cylindrical recess 46a which retains and supports load pin 45 such that the lower portion of load pin 45 extends out beyond the under edge of retaining block 46. The centerline of load pin 45 is located above the lower edge of retaining block 46 so that load pin 45 cannot drop out of cylindrical recess 46a. The lowermost portion of load pin 45 makes line contact with the top surface of deflection beam 44 and each end of pin 45 is tied to the deflection beam by a wire, such that as top plate 21 is lifted, there is a tendency to lift deflection beam 44 up and away from support buttons 47. However, inasmuch as the support buttons are securely fastened to bottom plate 22 by means of threaded fasteners 47a and are wired to deflection beam 44, the entire assembly of device 20 remains together regardless of how it is lifted or moved. Mounted to the top surface of deflection beam 44 is a strain gauge 52 and to the underside of deflection beam 44 is another strain gauge 53. Each of these strain gauges are securely mounted to either the top or bottom surface of deflection beam 44 by means of a suitable strain gauge cement. These strain gauges are electrically coupled to circuit section 37 as part of a wheatstone bridge. When a load is placed on top plate 21 as well as when a user stands on top plate 21, there will be a force, proportional to the weight of the load, exerted downwardly through the load pin retaining blocks 46, through the corresponding load pins 45, and against the deflection beams 44. The total downwardly exerted force, relative to the weight of the object or individual, will be apportioned among the three load pins 45 depending upon the position of the center of gravity of the weight relative to the location of each of the three deflection beam assemblies. As the force due to the load is transferred through the load pins to each deflection beam, the beams will deflect downwardly in an amount proportional to the amount of force on the particular deflection beam. This downward deflection will cause the strain gauges on the top surface of each deflection beam 44 to experience dimensional compression which will cause their nominal resistance to increase while the strain gauges on the bottom surface of each deflection beam 44 will experience dimensional extension which will cause their nominal resistance to decrease. The three top surface mounted strain gauges 52 are electrically joined in series as one arm of a wheatstone bridge within circuit section 37 and the three strain gauges 53, mounted on the underside of deflection beam 44, are also electrically wired in series as another arm of the same wheatstone bridge. Each strain gauge has a nominal resistance of 120 ohms and a gauge factor of approximately 2.07. The effects of the resistance increases and decreases will be treated when circuit section 37 is described in greater detail hereinafter.

Although strain gauges are common use devices in various mechanical stress analysis and testing experimentation, one disadvantage is the fact that if a stress-strain analysis is required at a particular point or a particular region, the corresponding strain gauge must be accurately positioned over that region in order to record the corresponding strain indications. With large volume production of electromechanical devices such as device 20, one significant factor which contributes to the cost is the manufacturing and assembling time for the electronics. If each strain gauge which is mounted in device 20 had to be accurately positioned on its corresponding top or bottom surface of each deflection beam 44, the cost of device 20 would be greater than if the gauge mounting location had a wide tolerance zone. In order to reduce such labor costs, each deflection beam assembly of device 20 includes a computer-designed deflection beam 44 and due to this computer-designed shape it is possible to mount strain gauges 52 and 53 at virtually any location within a certain range on the corresponding deflection beam 44 surfaces and the same strain for a particular force will be recorded regardless of the position of mounting of the strain gauges. The computer-designed shape of deflection beam 44 is illustrated in FIGS. 3–6 and in detail in FIG. 5. Deflection beam end portions 50a and 51a are excluded from the computer design of beam 44 and are used primarily as the mounting and support means in connection with support buttons 47. The actual computer design of deflection beam 44 begins with the point of line contact that load pin 45 makes with deflection beam 44, as indicated by transverse centerline 56, and extends in a tapered manner outwardly toward opposite end portions 50a and 51a. The specific regions which are configured according to the computer design between centerline 56 and these opposite end portions are identified as area 57 bounded by dotted lines 57A and 57B and area 58 bounded by dotted lines 58A and 58B and it is to be understood that these area references pertain to both the top and the bottom of deflection beam 44 inasmuch as strain gauges 52 and 53 could be mounted on either side of centerline 56 so long as strain gauges 52 are on the top side of the deflection beams in either area 57 or 58 and strain gauges 53 are on the underside in either area 57 or 58. Areas 57 and 58 are the strain sensing areas for the particular deflection beam and it is these areas where the strain indication is nearly constant for a given load thereby enabling freedom in positioning the strain gauges. The change in resistance of strain gauges 52 and 53 is in proportion to the extent of dimensional extension or dimensional compression sensed at the region where the strain gauge is mounted. Each strain gauge is mounted so as to measure the strain in the direction of the length of the beam. With the force of the load on top plate 21 transmitted through the three line contacts that load pins 45 make with beams 44 (corresponding to centerline 56), maximum deflection in a beam of constant cross section will coincide with centerline 56, and hence the magnitude of compression or extension, as seen by the strain gauges, would normally decrease with the distance outwardly from centerline 56 toward either end portion. However, the stress in a beam is also a function of the beam's cross-sectional area and as each beam 44 tapers toward the opposite ends from centerline 56, the cross-sectional area decreases in the areas 57 and 58 resulting in an increase in the strain produced by bending. The decrease in strain due to its distance away from the line of the force (centerline 56) is compensated for by a corresponding decrease in the cross-sectional area of deflection beam 44. Consequently, at any point within area 57 or 58, the strain measurement by means of either compressed strain gauges 52 or tensioned strain gauges 53 will be identical regardless of their position. The entire decrease in cross-sectional area is due to the decrease in the width of beam 44 in that beam 44 is of a uniform thickness throughout. The length of each area 57 and 58 comprises a substantial portion of the overall length from one end of the beam to the other end of deflection beam 44. This computer-designed deflection beam 44 is thus able to be used in large volume production whereby the bonding of the strain gauge to deflection beam 44 can be done quickly and easily without attention being directed to the finding of and the placement at a precise location.

Figure 6:
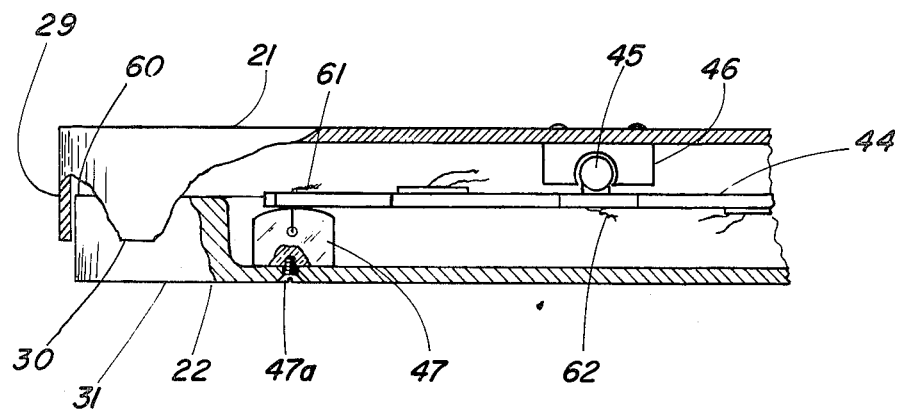
FIG. 6 is a fragmentary side view of the FIG. 1 device taken along line 6—6 in FIG. 1.

FIG. 6 illustrates the relationship between top plate 21 and bottom plate 22 and shows in greater detail depending lip portion 29 lower edge 30 and underside 31 as well as the internal structural details of top plate 21 and bottom plate 22. This figure shows the various structural members tied together and how the internal circuitry and other portions such as display readouts 24–26 are shielded from potential damage by means of the overlap between depending lip 29 and outer edge 60 of bottom plate 22. Wires 61 tie deflection beam 44 to the support buttons 47 and wires 62 tie load pin 45 to deflection beam 44 as has been previously mentioned. It is to be understood that the wires are wound snug but do not create any significant degree of force which is sufficient to deflect deflection beam 44. However, an electrical zero adjustment is provided as part of circuit section 37 in order to remove the effect of the wires if they are wound too tightly. This electrical zero adjustment may thus be used to remove the effect of tightly wound wires, or any other undesired effects, so that initial deflection readings will be zero. The wires are wrapped in such a manner that there is a minimum of movement permitted by beam 44 such that the entire device 20 can be lifted, moved and turned without the alignment relationship between external structural members being changed or affected.

Figure 7:
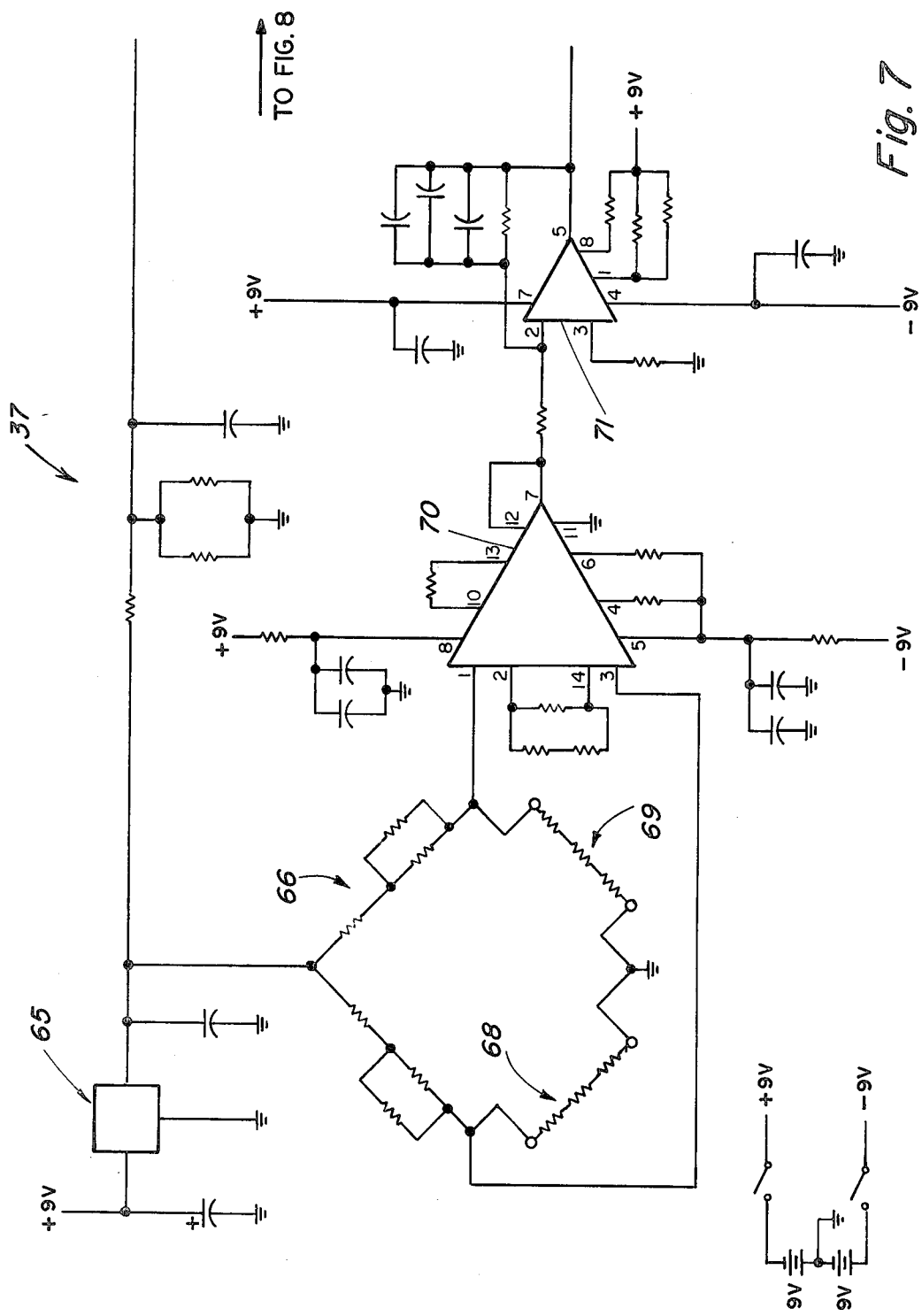
FIG. 7 is one part of a circuit schematic of the electronics comprising a portion of the FIG. 1 device.

Referring now to FIGS. 7 and 8, circuit section 37 will be described in greater detail. A plus 9 volt DC potential, provided by batteries 40, drives a 5 volt regulator 65 which may be, for example, an LM 78L5, that produces a noise-free voltage for the wheatstone bridge circuit 66 and the reference voltage for the analog to digital converter 67 which may be, for example, an MC 14433 offered by Motorola Semiconductor Products, Inc. of Tempe, Arizona. Lower leg 68 of wheatstone bridge circuit 66 contains the three strain gauges 52 wired in electrical series with each other. Lower leg 69 of wheatstone bridge circuit 66 includes strain gauges 53 wired in electrical series. The upper legs of wheatstone bridge circuit 66 are used to effect zero adjustment of the weight-measuring and display device 20 by means of selected resistors. The differential voltage from the wheatstone bridge circuit 66 is applied to the instrumentation amplifier 70 which may be, for example, an AD 521 offered by Analog Devices of Norwood, Massachusetts. This amplifier 70 has resistors between pins 2 and 14 that adjust the gain of the amplifier and therefore, the calibration of the weight-measuring and display device 20. The resistors between pins 4 and 6 are also usable for zero adjustment, if necessary. The addition of such resistors also aids in temperature stability and are preferred to be installed even if zero adjustment is not required. The amplified signal out from amplifier 70 is coupled to one input of filtering operational amplifier 71 which may be, for example, an LM 312. The filtering is accomplished by an RC circuit having a time constant of about 0.3 seconds and serves to dampen out oscillations resulting from fluctuating strain indications as might be caused by a user shifting his weight. The resistors connected between pins 1 and 8 of amplifier 71 are also used for zero adjustment. The filtered signal out from amplifier 71 is sampled by the analog to digital converter 67 and compared to the reference voltage applied to pin 1 of converter 67 to determine what the ratio is between the unkown voltage in at pin 3 and the reference voltage at pin 2 with respect to analog ground at pin 1. A ratiometric conversion occurs wherein this ratio is converted to a four-digit BCD number and is output on the $Q_0$, $Q_1$, $Q_2$ and $Q_3$ lines one digit at a time corresponding to the $D_2$, $D_3$ or $D_4$ output lines. The BCD digit on the $Q_0$–$Q_3$ lines is decoded by a BCD to seven-segment decoder 72 in order to determine which segments must be illumintated to form the desired digit on readouts 24–26. A suitable BCD to seven-segment decoder may be, for example, a CD 4511. The seven output pins of decoder 72 are each coupled through a current-limiting resistor of the group 73 of current-limiting resistors to a corresponding one of the seven segements on each of the readouts 24–26 which may be, for example, an FND 560 offered by Fairchild of Mountain View, California. The BCD digit enables output $D_2$, $D_3$ or $D_4$ to drive darlington amplifier inverters 75, 76 or 77, respectively, in order to ground pin 3 of the appropriate digit that is to be turned on. A suitable amplifier inverter for inverters 75–77 may be, for example, an MC 75492 offered by Motorola Semiconductor Products, Inc. of Tempe, Arizona. The BCD data and the digit enable outputs to cycle through the three digits approximately 640 times a second in order to produce what looks line a continuous display to the human eye. The analog to digital converter 67 has an end of conversion output (pin 14) that normally is used to enable the output data update (pin 9). This feature is used to implement the two modes of operation that are possible with weight-measuring and display device 20. When switched into the continuous mode of operation, a user standing on device 20 will see the individual display readouts 24–26 climb up to the corresponding weight and when the person steps off of top plate 21, display readouts 24–26 will gradually drop back down to a zero indication. This would be the normal mode of operation and would closely coincide with conventional scale usage. There are, however, situations which occur wherein a user who normally wears eyeglasses, may be weighing himself prior to bathing or at some other point when the eyeglasses are not being worn. For many of these individuals, it would be difficult to read the numerical indications on display readouts 24–26 from their distance above device 20. For these individuals, the sample and hold mode can be selected in which there is a two-second delay prior to the correct weight appearing and once the person steps off of the scale, this displayed weight will remain in display readouts 24–26 so that the individual can raise the scale closer to his eyes and thereby be able to read what is displayed by readouts 24–26. Switch 27 is used for the these two mode select settings as well as to turn the entire unit off. The four NAND gates 80, 81, 82 and 83 perform the gating of the end of conversion pulse to the data update input of analog to digital converter 67. The timer 84, which may be for example, an NE 555, is triggered by the closing of switch 85. The timer 84 is set for approximately a two-second wait before it changes state and accomplishes two things. First, it enables the display (pin 4 of decoder 72) and secondly it stops the output data from the analog to digital convertor 67 (pin 9). The selected scale ratio for circuit section 37 as created by wheatstone bridge 66 and amplifiers 70 and 71 is a one milliohm change in resistance for each pound of load present on top plate 21.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A rigid structure for supporting a load positioned thereon which comprises:
   a top plate;
   a bottom plate positioned beneath and spaced apart from said top plate;
   a plurality of deflection beams arranged between said top and said bottom plates and supported by said bottom plate;
   means for transmitting a force to each of said plurality of said deflection beams to produce deflection therein, said forces resulting from a load positioned on said top plate;
   means for sensing a strain present within each of said plurality of deflection beams, said sensing means providing a measurable indication proportional to said load; and
   each one of said plurality of deflection beams having a strain sensing area with a transverse cross-sectional area which decreases as a function of increased longitudinal distance from said force thereby producing a near constant strain throughout said strain sensing area in response to said force, said sensing means being positioned on said strain sensing areas.

2. The rigid structure of claim 1 in which said sensing means includes a plurality of strain gauges, there being a first strain gauge bonded to one side of each of said plurality of deflection beams and a second strain gauge bonded to the opposite side of each of said plurality of deflection beams.

3. The rigid structure of claim 2 in which each of said deflection beams has a substantially uniform thickness throughout.

4. The rigid structure of claim 3 wherein there are three deflection beams and in which said transmitting means includes three cylindrical pins, each pin being positioned within a retaining member secured to said top plate, each pin being in line contact with a different one of said three deflection beams.

5. The rigid structure of claim 4 in which the longitudinal axis of each of said deflection beams is perpendicular to a line extending radially from the center of said bottom plate, there being three such lines equally spaced from each other, each line being substantially coincident with a cylindrical axis of a corresponding one of said pins.

6. The rigid structure of claim 3 in which in response to a load on said top plate said first strain gauges experience an increase in resistance and said second strain gauges experience a decrease in resistance.

7. The rigid structure of claim 6 in which said top and bottom plates are constructed of high-impact plastic.

8. A weight-measuring and display device for displaying the weight of a load positioned thereon which comprises:
   (a) a rigid structure comprising:
     1. a top plate;
     2. a bottom plate positioned beneath and spaced apart from said top plate;
     3. a plurality of deflection beams each arranged between said top and said bottom plates and supported by said bottom plate, each one of said plurality of deflection beams having a substantially uniform thickness throughout;
     4. means for transmitting a transverse line of force to the approximate transverse centerline of each of said plurality of said deflection beams to produce deflection therein said transverse of force resulting from a load positioned on said top plate, each one of said plurality of deflection beams having side edges which taper inwardly as they longitudinally extend in an outwardly direction from said corresponding transverse line of force; and
     5. means for sensing a strain present within said inwardly tapering portions of each of said plurality of deflection beams, said sensing means providing a data signal proportional to said load;
   (b) strain-measuring and display driver circuit means for providing a change of resistance indication in response to said data signal; and
   (c) display means coupled to said strain-measuring and display driver circuit means for providing a readout of the weight of the load positioned on said top plate.

9. The device of claim 8 in which there are three deflection beams and said sensing means includes a first strain gauge bonded to one side of each deflection beam and a second strain gauge bonded to the opposite side of each deflection beam.

10. The device of claim 9 in which said three first strain gauges are connected in electrical series comprising one arm of a wheatstone bridge and said three second strain gauges are connected in electrical series comprising another arm of said wheatstone bridge.

11. The device of claim 10 in which each of said strain gauges have a nominal resistance of 120 ohms and a gauge factor of approximately 2.07.

12. The device of claim 11 in which said change in resistance of said strain gauges occurs according to the ratio of milliohm per pound of load positioned on said top plate.

13. The device of claim 12 in which said strain-measuring and display driver circuit is energized by the delivery of D.C. voltage supplied from batteries within said rigid structure.

14. A strain-measuring and weight-displaying circuit which comprises:
   a voltage supply section;
   a wheatstone bridge circuit coupled to said voltage supply section, one arm of said wheatstone bridge having a plurality of compression strain gauges wired in electrical series and a second arm having a plurality of extension strain gauges wired in electrical series;
   amplifier circuit means having two input pins and providing an output proportional to the voltage difference present as between said two input pins;
   an analog to digital converter section providing at its output a binary coded decimal signal;
   a binary coded decimal to seven-segment decoder section coupled to said analog to digital converter and providing an output current suitable for illuminating a display device; and
   circuitry means for providing a selectable first mode of operation of a continuous display nature and an alternate selectable second mode of operation of a sample and hold nature wherein the indicia of said display device is held, said modes being selectable by means of a switch.

15. The circuit of claim 14 in which said amplifier circuit means includes an operational amplifier section having a filter for dampening out oscillations resulting from fluctuating strain indications and further having an analog voltage output proportional to the change in resistance of said strain gauges.

16. The circuit of claim 15 which further includes a plurality of seven-segment LED readouts, said plurality of seven-segment LED readouts being enabled sequentially, one at a time, by a ground referece input from the analog-to-digital converter section.

17. The circuit of claim 16 in which said seven-segment LED readouts provide a visible indication of pounds proportional to the strain measured by said strain gauges according to the ratio of one milliohm per pound.

18. The circuit of claim 17 in which there are three seven-segement LED readouts the group of three being illuminated sequentially 640 times a second.

19. The circuit of claim 18 wherein said strain gauges have a nominal resistance of 120 ohms and a gauge factor of approxomately 2.07 and wherein said filter for dampening out oscillations includes an RC circuit coupled in parallel across an operational amplifier, said filter having a time constant of approximately 0.3 seconds.

20. The circuit of claim 19 in which said analog-to-digital converter section has a second input coupled to a reference voltage supplied by said voltage supply section and a third input coupled to a ground reference, said converter performing a ratiometric conversion voltage on the first input with respect to the voltage on the second input of said converter.

21. A rigid structure for supporting a load positioned thereon which comprises:
a top support member having a substantially flat upper surface and an annular edge depending from the periphery of said substantially flat upper surface;
a base member positioned beneath said substantially flat upper surface and inside of said annular edge, said base member having a plurality of deflection beam cavities and a plurality of circuitry cavities, each of said cavities having a surrounding wall portion;
a plurality of deflection beams positioned within said deflection beam cavities, there being only one deflection beam in each of said deflection beam cavities;
means for transmitting a force to each of said plurality of deflection beams to produce deflection therein, said forces resulting from a load positioned on said top support member; and
means for sensing a strain present within each of said plurality of deflection beams, said sensing means providing a measurable indication proportional to said load.

22. The rigid structure of claim 21 which further includes a strain-measuring and weight-displaying circuit, said circuit being arranged for operation is a first mode for continuous display of data corresponding to said measurable indication and operable in a second mode wherein said data is held in display, said first and second modes of operation being manually selectable by means of a switch, said strain-measuring and weight-displaying circuitry being disposed within said plurality of circuitry cavities.

23. The rigid structure of claim 22 wherein each one of said plurality of deflection beams has a strain sensing area with a transverse cross-sectional area which decreases as a function of increased longitudinal distance from the transverse centerline of said corresponding deflection beam.

24. A rigid structure for supporting a load positioned thereon which comprises:
a top plate;
a bottom plate positioned beneath and spaced apart from the top plate;
three deflection beams having a substantially uniform thickness throughout and arranged between said top and said bottom plates and supported by said bottom plate;
three cylindrical pins, each positioned within a retaining member which is secured to said top plate, there being a different one of each of said cylindrical pins in line contact with a different one of said three deflection beams for transmitting a transverse line of force to each of said deflection beams to produce deflection therein, said transverse lines of force resulting from a load positioned on said top plate; and
means for sensing a strain present within each of said plurality of deflection beams, said sensing means providing a measurable indication proportional to said load.

25. The rigid structure of claim 24 in which said sensing means includes a plurality of strain gauges and said measurable indication is a change in resistance of said strain gauges.

26. The rigid structure of claim 25 in which each of said strain gauges has a nominal resistance of 120 ohms and a gauge factor of approximately 2.07 and in which in response to a load on said top plate certain ones of said strain gauges experience an increase in resistance and other ones of said strain gauges experience a decrease in resistance.

27. The rigid structure of claim 26 in which said top and bottom plates are constructed of high-impact plastic.

* * * * *